United States Patent [19]
Stevens

[11] 3,826,324
[45] July 30, 1974

[54] TRAILER MOVER
[76] Inventor: Duane M. Stevens, 1216 El Monte Dr., Simi, Calif. 93065
[22] Filed: Oct. 26, 1972
[21] Appl. No.: 300,973

[52] U.S. Cl.................................. 180/6.5, 180/74
[51] Int. Cl............................................ B62d 11/04
[58] Field of Search............. 180/6.5, 6.2, 74, 14 R, 180/14 A, 19 R

[56] References Cited
UNITED STATES PATENTS
| | | | |
|---|---|---|---|
| 2,798,565 | 7/1957 | Rosenthal et al. | 180/6.5 |
| 2,879,857 | 3/1959 | Kreiss | 180/6.2 |
| 3,112,001 | 11/1963 | Wise | 180/6.5 |

FOREIGN PATENTS OR APPLICATIONS
| | | | |
|---|---|---|---|
| 498,862 | 9/1954 | Italy | 180/74 |

*Primary Examiner*—David Schonberg
*Assistant Examiner*—John A. Pekar
*Attorney, Agent, or Firm*—Roger A. Marrs

[57] ABSTRACT

A powered mover is disclosed herein for positioning a wheeled trailer or the like in a forward, rearward or pivotal direction which includes a drive drum associated with each wheel that is pivotally carried on the chassis of the trailer and operably coupled to a drive motor via a drive gear train whereby the exterior periphery of the drum frictionally engages with the tread of the trailer wheel in a driving relationship. A control mechanism is operatively carried on the chassis for positioning the drum into and out of engagement with the tire tread. Powered rotary movement and speed of the drum is imparted to the tire for driving the trailer in a selected direction in response to the direction of the drum rotation as determined by an electrical control circuit.

9 Claims, 8 Drawing Figures

PATENTED JUL 30 1974

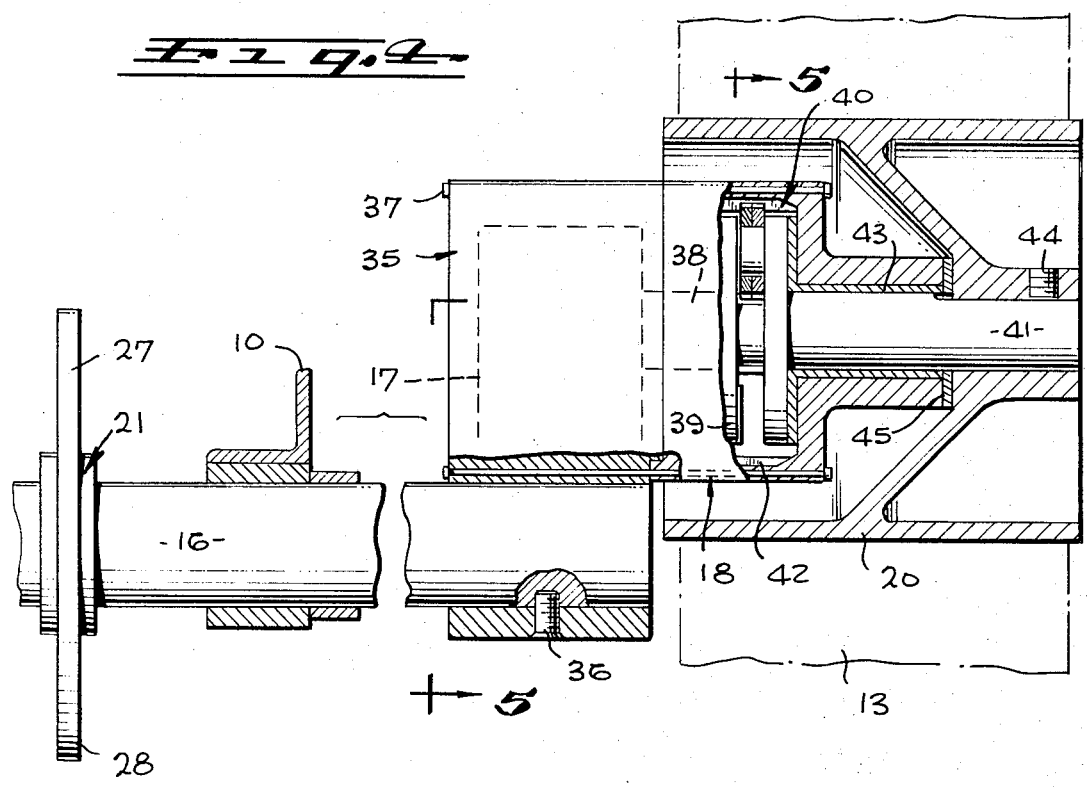
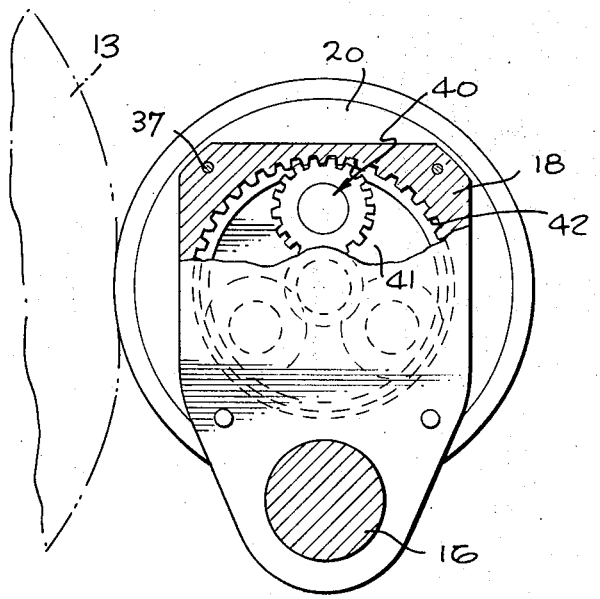

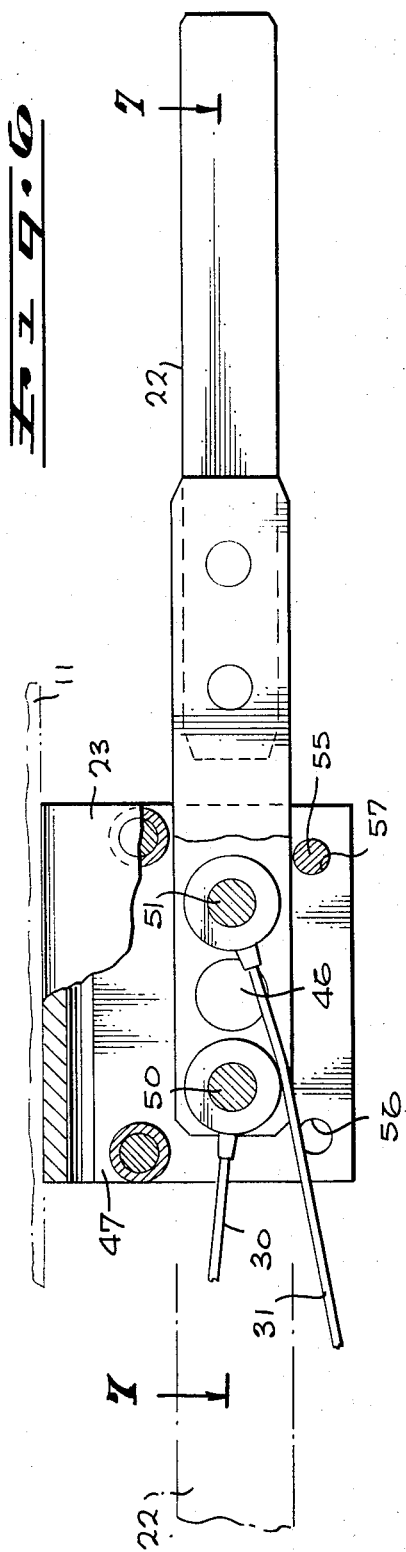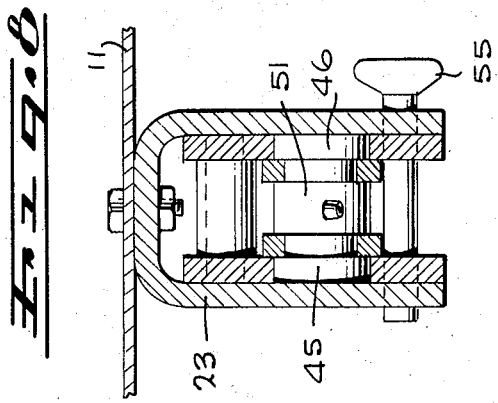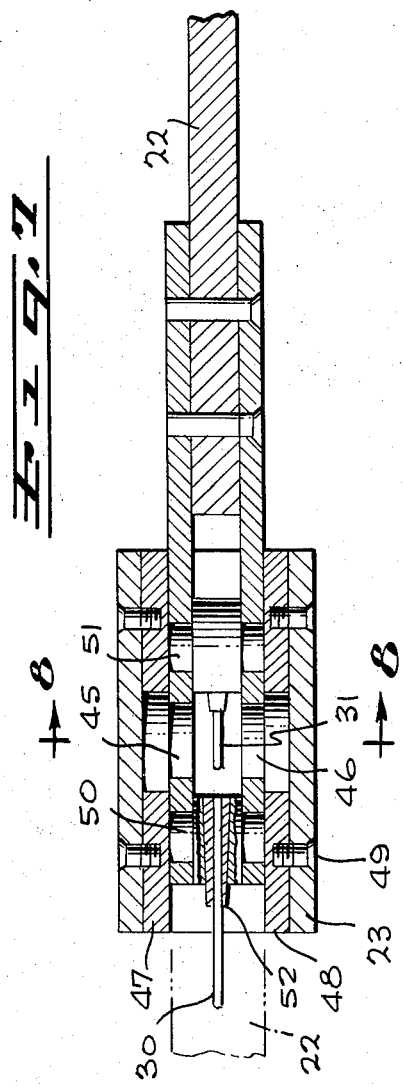

TRAILER MOVER

BACKGROUND OF THE INVENTION

1. Field of the Invention

This invention relates to vehicle moving devices and more particularly to a novel powered moving apparatus for positioning a variety of travel vehicles without resort to the vehicle's main power plant.

2. Description of the Prior Art

In the present-day recreational field, it is common practice to employ a variety of travel vehicles such as mobile homes, travel trailers, boat trailers, camper vehicles and the like. It is particularly cumbersome and awkward to park such a vehicle as a travel trailer or mobile home in an off-the-street environment such as at a campsite, riverbed, beach location or other recreational site due to the fact that the ground or terrain is uneven and the presence of rocks and other obstructions are sometimes present. In such situations, it has been the conventional practice to position the trailer or vehicle by the use of the vehicle's primary power plant which is difficult since the driver must rely on conventional backup procedures in which his visibility is greatly restricted and opportunity for precise location of the trailer or vehicle is difficult to achieve. An alternate method of positioning the trailer or vehicle is to manually push or force the trailer or vehicle into the desired location. Obviously, this is undesirable since the vehicle or trailer is relatively heavy and manual control is difficult.

Therefore, there has been a long-standing need in the recreational field to provide an auxiliary mover for such vehicles as trailers that incorporates its own power plant so as to be self-propelled and that does not rely on the primary power plant of the trailer or vehicle. Such an auxiliary mover should incorporate controls so that positioning of the vehicle or trailer may be in a forward or rearward direction, and such controls should provide for suitable starting and stopping of the auxiliary system.

SUMMARY OF THE INVENTION

Accordingly, the above-mentioned problems and difficulties are obviated by the present invention which provides a novel auxiliary mover for trailers and vehicles which provides an auxiliary power plant carried on the chassis of the trailer in operable connection with a driving means engageable with the tread of the trailer's or vehicle's tires. Control mechanism is carried on the chassis in connection with the power plant for starting and stopping the power plant and further includes means for placing the moving means into and out of engagement with the tire tread. In one form, such means includes a manually operated control handle connected via cables and a bell crank to a transverse shaft carried on the chassis which serves as a mounting for the auxiliary power means. The moving means may take the form of a circular drum rotatable by the power means through a gear train so that rotary motion of the drum is imparted to the trailer or vehicle tire.

Therefore, it is among the primary objects of the present invention to provide a novel trailer or vehicle mover incorporating an auxiliary power means for driving the wheeled trailer or vehicle during the positioning thereof in a parking procedure.

Another object of the present invention is to provide a novel trailer mover having a self-propelled power means for driving the wheels of the vehicle or trailer via a rotary drum selectively engageable with the tire tread of the wheeled vehicle or trailer.

Another object of the present invention is to provide an auxiliary moving device for vehicles and trailers capable of powering the movement of the vehicle or trailer during a parking procedure and which incorporates a control mechanism for selectively engaging the power means with the wheels of the vehicle or trailer at the selection of the user.

Still another object of the present invention is to provide a novel auxiliary vehicle or trailer mover which is economical to manufacture, easy to install and that may be readily operated by one having ordinary mechanical skills.

Yet another object of the present invention is to provide a novel auxiliary vehicle or trailer mover which is self-contained on the trailer or vehicle so that it is ready for use and does not require assembly or disassembly of the necessary parts.

Still a further object of the present invention is to provide a novel auxiliary mover for wheeled vehicles and trailers that may be readily installed on conventional vehicles and trailers without modifying or requiring extensive reconstruction of the vehicle or trailer.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 4 is an enlarged sectional view of the trailer mover illustrating the motor means and the gear train thereof;

FIG. 5 is a transverse cross sectional view of the trailer mover shown in FIG. 4 as taken in the direction of arrows 5—5 thereof;

FIG. 6 is an enlarged view, partly in section, of the control mechanism;

FIG. 7 is a plan view, in section, of the control mechanism shown in FIG. 6; and FIG. 8 is a transverse cross sectional view of the control mechanism as taken in the direction of arrows 8—8 of FIG. 7.

DESCRIPTION OF THE PREFERRED EMBODIMENT

Figure 1:
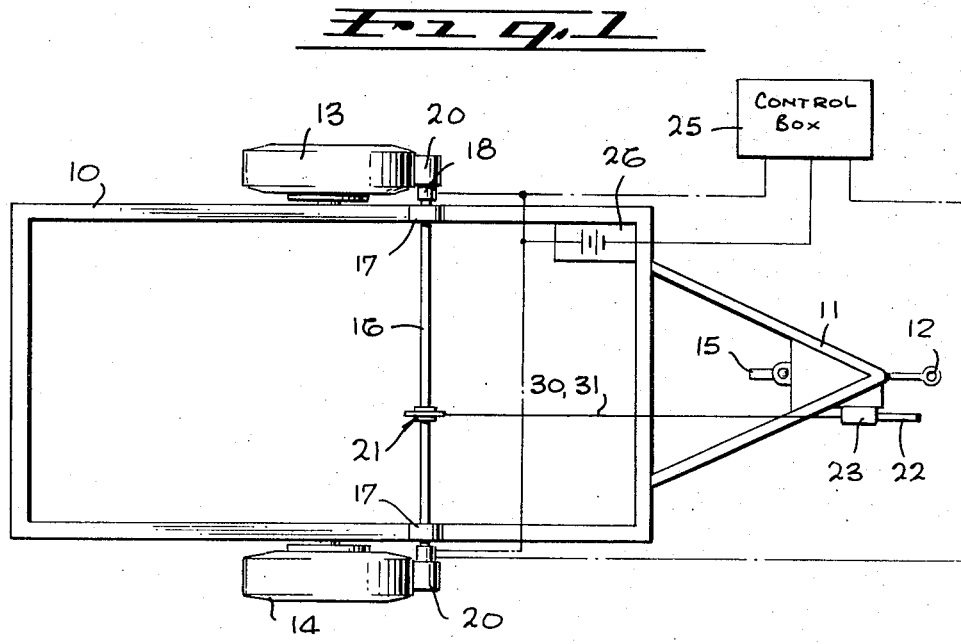
FIG. 1 is a top plan view of the novel trailer mover shown in a typical installation on a wheeled trailer.

Referring to FIG. 1, a trailer is illustrated comprising a rectangular frame 10 having a towing brace 11 carried at one end thereof terminating in a coupler 12 for attaching to a conventional towing coupler or ball mounted on the rear bumper of a motor vehicle. The trailer further includes a pair of wheels 13 and 14 rotatably mounted on the outside of the frame 10 on either side of the frame respectively so that the trailer is mobile and may be moved in a forward and rearward direction. Wheels 13 and 14 are attached to the frame by conventional means such as axles and bearings. Furthermore, the trailer includes a front stabilizing wheel 15, pivotally carried from a mounting plate secured to the towing brace 11 of the trailer. Wheel 15 is adapted for pivotal rotation about a vertical axis as well as ground rotation about a horizontal axis.

The trailer mover of the present invention includes a transverse bar 16 extending between the opposite sides of frame 10 and in rotatable relationship therewith. Each end of the bar 16 fixedly mounts a DC reversible motor 17, a gear box 18 and a drive drum 20. Components 17, 18 and 20 are secured to the end of rod 16 so as to pivot with the rod when rod is actuated by a manual control mechanism whereby the periphery of drive drum 20 engages and disengages with the tread of the tire carried on wheel 13. The manual control mechanism includes a bell crank 21 fixedly carried on the rod 16 and a control lever 22 carried on the trailer forward towing brace 11 by means of a U-shaped bracket 23. Through an overcenter toggle mechanism (to be described later) the lever 22 is operably connected to the opposite end of bell crank 21 by a pair of cables indicated by numerals 30 and 31. Positioning of lever 22 in a first position rotates rod 16 so as to engage the drive drum with the tread of the tire while rotation of lever 22 to a second position disengages the drive drum from the tire.

For rotation of drive drum 20 whereby its rotational force is imparted to the wheel, a control box 25 is provided having circuits and manually operated switches for placing the DC motor in a forward rotating condition or reverse rotating condition providing directional rotation of the drum 20 for moving the trailer in a forward or rearward direction. Also, the circuits contained within control box 25 are arranged for operating the drive motors on either side of frame 10 associated with wheels 13 and 14 in a differential manner so that the trailer will pivot about either one of a selected wheel. Power for the control circuits is supplied by a storage battery 26 which is operatively connected in circuit with the control box and the respective DC drive motors 18.

During the following description, it is to be understood that the description of the motor, gear box and drive drum will be discussed with respect to one side of frame 10 associated with wheel 13 and that an identical drive system and train is employed in connection with wheel 14 on the opposite side of frame 10. Furthermore, it is to be understood that although a conventional trailer is illustrated, the present invention can be applied to a mobile home, camper or other type of recreational vehicle.

Figure 2:
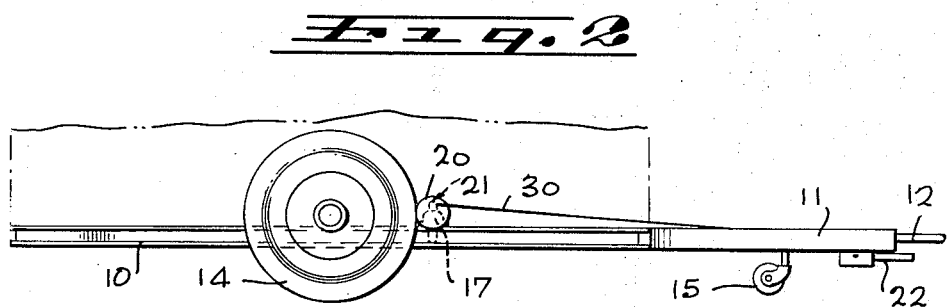
FIG. 2 is a side elevational view of the trailer mover illustrated in FIG. 1.
Figure 3:
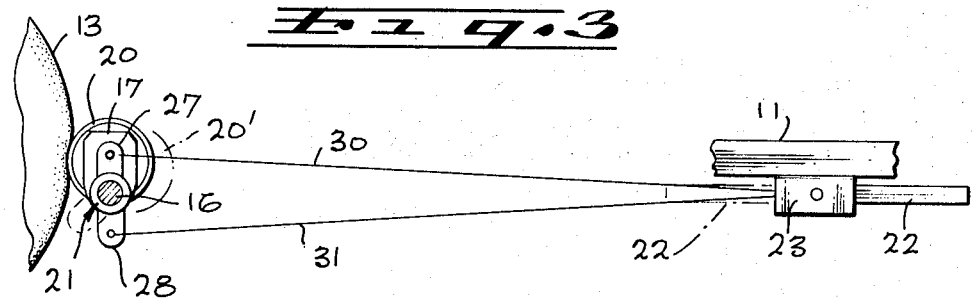
FIG. 3 is an enlarged side elevational view of the control mechanism for activating the trailer mover.

Referring now in detail to FIG. 2, it can be seen that the lever 22 is mounted below the trailer forward brace 11 and that the trailer is supported on the ground by the wheels 13 and 14 as well as stabilizing wheel 15. Obviously, when the trailer is being towed by a vehicle, drum 20 will not engage with wheel 13 and roller 15 will not engage with the ground. Greater detail of the invention is shown in FIG. 3 wherein bell crank 21 includes upper and lower extensions or lobes 27 and 28 which outwardly project from opposite sides of a mounting collar fixedly connected to transverse rod 16. The opposite ends of control cables 30 and 31 are connected to each of the lobes 27 and 28 respectively, while the opposite ends of the cables are connected to the overcenter toggle mechanism associated with handle 22. It is to be noted that when drum 20 is engaged with tire 13, the periphery of the tire is somewhat depressed so that adequate frictional engagement exists between the control drum and the tire tread for imparting force to the tire. As shown in broken lines, the drum 20' is disengaged with the tire tread and the bell crank 21 having lobes 27 and 28 is cocked at about a 45° angle from vertical.

Referring now to FIG. 4 in detail, it can be seen that as the bell crank 21 is pulled by the control cables, rod 16 will rotate therewith and that rod 16 is rotatably carried by a beam in the frame 10. At the extreme end of rod 16, a motor housing 35 is fixedly secured thereto by means of a fastener 36. The housing 35 houses the DC reversible motor 17. Fixedly secured to one end of housing 35, there is provided a gear housing indicated by numeral 18 which is fastened thereto by a plurality of bolts 37. The gear housing 18 encloses a geared drive train which may take the form of a planetary gearing arrangement wherein an output pinion 38 from the motor 17 operably drives a set of planetary gears via a cage assembly 39. Multiple stages of planetary gears may be provided as desired. However, a set of planetary gears are indicated by numeral 40 which are rotatably carried on axles protruding from one side of an output shaft 41. The planetary gears mesh with internal teeth arranged as a circular gear formed in the housing 18 and as indicated by numeral 42 in FIG. 5. Output shaft 41 is rotatably carried in a journal bearing 43 through the stationary gear housing 18 so that a portion thereof extends beyond the housing. On this latter extension, drum 20 is securely fastened by means of a flat-sided fastener 44. A seal 45 separates the hub of drum 20 from the stationary housing 18.

As shown more clearly in FIG. 5, planetary gear 40 meshes with teeth 42 which rotatably turns outward shaft 41. As the output shaft 41 rotates, drum 20 will rotate thereon to frictionally engage with tread of tire 13.

The control mechanism is shown more clearly in FIGS. 6–8 inclusive wherein it can be seen that handle 22 rotates about pivot points 45 and 46 which are held in position by plates 47 and 48. The plates are held to bracket 23 by means of fasteners 49. As shown in FIG. 7, plates 47 and 48 are arranged in fixed spaced apart relationship in order to accommodate one end of handle 22 so that the handle may be rotated therebetween from a non-engagement position shown in broken lines to a drum/tire tread engagement shown in solid lines. The end of lever 22 within the bracket 23 is employed to carry a pair of pivots 50 and 51 which are arranged on opposite sides of the lever pivots 45 and 46. This arrangement provides an overcenter toggle mechanism in conjunction with the cables 30 and 31 which are each coupled to the respective pivots by a swaged collet 52. As the lever 22 is moved from the position shown in solid lines to the position shown in broken lines, the respective pivots 50 and 51 reverse positions with respect to the bracket 23 so that the upper cable 30 is pulled to the forward end of the trailer while the lower cable 31 extends further to the rear of the trailer. This movement or positioning is translated into movement of the bell crank 21 so as to rotate rod 16.

As shown in FIG. 8, a key retainer 55 is insertably received within either holes 56 or 57 formed in bracket 23 so as to support the lever 22 in either the engagement position or the disengaged position. When the key 55 is inserted through the mated holes 57 in the bracket, the lever 22 is held in the engaged position when key 55 is inserted through hole 56, the lever 22 is held in a disengaged position.

In view of the foregoing, it can be seen that the novel trailer mover of the present invention provides a means for powering a trailer on its own wheels about a parking area in such a manner that the wheels may be powered in opposite directions for pivoting the trailer or the wheels may be rotated in one direction or another in order to move the trailer forward or in reverse. Such positioning is achieved through manual manipulation of switches contained in the control box 25 that include a circuit connected directly to the motors 18 associated with each wheel. The control box circuit includes an arrangement of electrical components such as switches and resistances that permit control of voltage applied to the motors whereby speed and direction of rotation are determined by the manual manipulation of control knobs. The speed and direction of rotation of each drive drum may be achieved both together or separately. Engagement or disengagement of the drive drums 20 associated with each wheel is under the control of lever 22 via the control mechanism including the cables 30 and 31 operating in conjunction with the overcenter toggle mechanism and the bell crank 21. The motors and gear housings are fixedly secured to the ends of the rotating rod 16 which is under the control of the control mechanism. The trailer mover of the present invention may be readily installed on existing trailers and other recreational vehicles without extensive modification to production vehicles. The components of the trailer mover are arranged so that ready accessibility may be had to any of the component parts for service or maintenance purposes.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A trailer mover for positioning a trailer in a forward, rearward or pivoting direction comprising the combination of:
   a chasis having a pair of wheels rotatably carried on opposite sides of said chassis;
   drive means pivotally carried on said chassis for selective driving engagement and non-driving disengagement with the tread of said wheels;
   power means operably connected to said drive means for rotating said drive means for imparting a driving force to said wheels when said drive means is pivoted in driving engagement with said wheels;
   control means operably coupled to said power means and said drive means for pivoting said drive means into and out of engagement with said wheels and for starting and stopping said power means;
   said drive means includes a rotatable drum having its exterior periphery adapted to impart said driving force and said power means includes a DC reversible motor coupled in driving relationship to said drum;
   pivotal means mounting said power means and said drive means to said chasis;
   said pivotal means includes a bar extending transversely across the chassis and rotatably carried thereon; said bar having opposite ends terminating adjacent said wheels; and
   said power means and said drive means carried on said terminating ends.

2. The invention as defined in claim 1 wherein
said control means includes a control mechanism connected between said bar and said chassis comprising a bell crank secured to said bar, a rotatable handle carried on said chassis and a pair of control cables interconnecting said handle with said bell crank whereby rotation of said handle is translated into pivotal movement of said bar via said control cables and said bell crank.

3. The invention as defined in claim 2 including
an over-center toggle mechanism operably connecting said handle to said control cables.

4. The invention as defined in claim 3 including
a gear train operably connecting said motor to said drum and including a common housing for enclosing said motor and said gear train.

5. The invention as defined in claim 4 wherein
said control means further includes an electrical circuit connected to said motor for determining drum speed and direction of rotation of said drive means.

6. The invention as defined in claim 5 wherein
said bell crank, said control cables and said handle substantially lie along the longitudinal axis of said chassis.

7. The invention as defined in claim 6 wherein
said drum exterior periphery depresses into the tread of said wheels in driving frictional engagement therewith when said drum is in engagement with said wheels.

8. A trailer mover for positioning a trailer in a forward, rearward or pivoting direction comprising the combination of:
   a chasis having a pair of wheels rotatably carried on opposite sides of said chassis;
   drive means pivotally carried on said chassis for selective driving engagement and non-driving disengagement with the tread of said wheels;
   power means operably connected to said drive means for rotating said drive means for imparting a driving force to said wheels when said drive means is pivoted in driving engagement with said wheels;
   control means operably coupled to said power means and said drive means for pivoting said drive means into and out of engagement with said wheels and for starting and stopping said power means;
   pivotal means mounting said power means and said drive means to said chasis;
   said pivotal means includes a bar extending transversely across the chassis and rotatably carried thereon; said bar having opposite ends terminating adjacent said wheels; and
   said power means and said drive means carried on said terminating ends.

9. The invention as defined in claim 8
wherein said control means includes a control mechanism connected between said bar and said chassis comprising a bell crank secured to said bar, a rotatable handle carried on said chassis and control cables interconnecting said handle with said bell crank.

* * * * *